United States Patent
Cheng et al.

(10) Patent No.: US 7,526,015 B2
(45) Date of Patent: Apr. 28, 2009

(54) PARALLEL CORRELATOR IMPLEMENTATION USING HYBRID CORRELATION IN SPREAD-SPECTRUM COMMUNICATION

(75) Inventors: MingQiang Cheng, Chengdu (CN); ShiJie Li, Chengdu (CN); Bo Yu, Chengdu (CN)

(73) Assignee: O2Micro International Ltd., Georgetown (KY)

( * ) Notice: Subject to any disclaimer, the term of this patent is extended or adjusted under 35 U.S.C. 154(b) by 630 days.

(21) Appl. No.: 11/227,290

(22) Filed: Sep. 15, 2005

(65) Prior Publication Data

US 2007/0058695 A1    Mar. 15, 2007

(51) Int. Cl.
    *H04B 1/00* (2006.01)
(52) U.S. Cl. .................. 375/150; 375/142; 375/148; 375/149; 375/130
(58) Field of Classification Search .......... 375/150, 375/324, 142, 148, 149
    See application file for complete search history.

(56) References Cited

U.S. PATENT DOCUMENTS

| | | | | |
|---|---|---|---|---|
| 5,579,338 A | * | 11/1996 | Kojima | 375/149 |
| 5,982,811 A | * | 11/1999 | Harrison et al. | 375/150 |
| 6,704,348 B2 | * | 3/2004 | Abraham et al. | 375/150 |
| 6,788,735 B2 | * | 9/2004 | Kohli et al. | 375/150 |
| 6,934,322 B2 | * | 8/2005 | King et al. | 375/150 |
| 2003/0112897 A1 | * | 6/2003 | Murthy et al. | 375/324 |
| 2007/0002933 A1 | * | 1/2007 | Cheng et al. | 375/142 |
| 2007/0183486 A1 | * | 8/2007 | Cheng et al. | 375/150 |
| 2007/0201539 A1 | * | 8/2007 | Yu et al. | 375/148 |

* cited by examiner

*Primary Examiner*—Sudhanshu C Pathak
(74) *Attorney, Agent, or Firm*—Wang Law Firm, Inc.; Li K. Wang

(57) ABSTRACT

A method for processing spread spectrum signals through a two step integration process in a circuit having an intermediate frequency signal preprocessing unit and a plurality of block integrators, wherein the circuit receiving a digitized signal, a local reference signal, and a pseudorandom noise code. The method includes generating a plurality of data streams by the intermediate frequency signal preprocessing unit using the digitized signal and the reference signal, receiving at each block integrator a data stream from the plurality of data streams and the pseudorandom noise code, performing a predetermined number of partial correlations at each block integrator using hybrid correlation technique based on the data stream and the pseudorandom noise code to obtain a predetermined number of partial correlation results, and computing a predetermined number of complete correlation results based on the predetermined number of partial correlation results. Each data stream is generated every predetermined time period.

44 Claims, 8 Drawing Sheets

PARALLEL CORRELATOR IMPLEMENTATION USING HYBRID CORRELATION IN SPREAD-SPECTRUM COMMUNICATION

FIELD OF THE INVENTION

The invention relates to spread spectrum digital signal processing, and more particularly, to parallel correlator implementation for processing spread spectrum digital signals.

BACKGROUND OF THE INVENTION

Spread spectrum communication is advantageous in communication applications requiring high reliability in a noisy environment. According to Shannon's theory, a widened spectrum can lower the requirement for a high signal-to-noise ratio, which indicates that a weak signal can be transmitted and detected by using the spread spectrum communication technology. In order to spread the spectrum, a high-speed pseudorandom noise (PRN) code is often used to modulate a narrow-band signal to generate a wide-band signal. To communicate data, the wide-band signal is modulated by a message data stream. The message data rate is usually much lower than the PRN code symbol or "chip" rate, and the data and code-chip signal edges are usually synchronized.

Message data from a spread spectrum signal, such as a global positioning system (GPS) signal, can be retrieved by first converting the received signal down to a lower frequency by multiplying it with a locally generated carrier signal. The local carrier signal may be generated by a properly tuned local oscillator. If the frequency and phase of the local carrier signal are the same as those of a received original narrow-band carrier, then the multiplier output signal from multiplication of the received signal and the local carrier signal will be a bipolar wide-band data stream. This bipolar wide-band data stream is the product of the bipolar PRN code and message data sequences. The PRN code is then removed by multiplying the wide-band data stream with a locally generated PRN code that is time aligned with the received PRN code. Thus, the message data can be obtained. The above-mentioned process is a signal despread process.

GPS signals are spread spectrum signals broadcasted by the GPS satellites on L1, L2, and L5 frequencies. Current commercial GPS receivers generally use the L1 frequency (1575.42 MHz). There are several signals broadcasted over the L1 frequency: coarse/acquisition(C/A) code, P code and the navigation data. The detailed information of the satellite orbit is contained in the navigation data. The C/A code is mainly used by civilian receivers for positioning purposes. The C/A code is used to determine a pseudo-range (the apparent distance to the satellite), which is then used by the GPS receiver to determine a position. The C/A code is a type of the pseudorandom noise (PRN) code, the functionality of which has been described above. A radio frequency signal coded by the C/A code becomes a spread spectrum signal. Each satellite has a unique C/A code and repeats the C/A code over and over again. The C/A code is a sequence of zeros and ones (binary). Each zero or one is known as a "chip". The C/A code is 1023 chips long, and it is broadcasted at 1.023 Mega-chips per second, i.e., the repetition of the C/A code lasts 1 millisecond. Thus, it should be appreciated by those skilled in the art that the word "chip" may be regarded as a measurement unit of a data length or a time length. The phrase with quotation marks such as "1 chip", "half a code chip", "33 chips", "32 chips" used in the following description should all be regarded as a measurement of time. It is also possible to regard each chip as having two states: +1 and −1.

A set of data collected by a GPS receiver usually contains signals from several satellites. Signals travel from different satellites through different channels. Usually, the GPS receiver simultaneously processes the signals from several channels. Each signal has a different C/A code with a different starting time and a different Doppler frequency shift. Therefore, to find a signal from a certain satellite, GPS receivers traditionally conduct a two dimensional search, checking each C/A code with different starting time at every possible frequency. "Different starting time," as used herein, can be interpreted as the result of the phase delay of a C/A code. In a GPS receiver, an acquisition method is employed to find the beginning of the C/A code and carrier frequency, in particular, the Doppler frequency shift of the signal. To test for the presence of a signal at a particular frequency and C/A code delay, the GPS receiver is tuned to the frequency, and the incoming signal is correlated with a known PRN code delayed by an amount corresponding to the-time of arrival. If no signal is detected, the search continues for the C/A code with a next possible delay. Traditionally, each possible delay of the C/A code is obtained by shifting the C/A code by half a chip. Since a C/A code comprises 1023 chips, 2046 delay possibilities may need to be checked for a fixed frequency. After all delay possibilities are checked, the search continues to a next possible frequency. Because thousands of frequencies and code delays may need to be checked, the speed of the acquisition process is highly important.

FIG. 1 illustrates a prior art block diagram of a GPS receiver 100. In general, a GPS receiver includes two parts: RF (radio frequency) front end module 101 and base-band signal processing module 103. The GPS signals transmitted from the GPS satellites are received from an antenna 102. Through a RF tuner 104 and a frequency synthesizer 105, a received signal (also known as input signal) is converted from the GPS signal (a radio frequency signal) to a signal with a desired output frequency. Then, an analog-to-digital converter (ADC) 106 digitizes the converted signal at a predetermined sampling frequency. The converted and digitized signal is known as intermediate frequency (IF) signal. The IF signal is then sent to the base-band signal processing module 103, which includes several signal processing stages. The IF signal is sent to an acquisition module 110 where Doppler frequency shift search and C/A code phase shift search are conducted, as described above. During the acquisition stage, the integration of the IF signal is completed by performing correlation based on the IF signal and C/A code. A tracking module 112 is capable of tracking the GPS signal through IF signal by using a carrier tracking loop and a code tracking loop, thus, obtaining the navigation data contained in the GPS signal. Then, a navigation data calculation module 114 and a position calculation module 116 may utilize the navigation data to calculate the user's position.

However, there are several problems that conventional GPS receivers are confronting. First, because the working frequency of the base-band signal processing module is usually dependent on the sampling frequency provided by the RF front end, the base-band signal processing module may support only one set of parameters such as a particular sampling frequency and a particular intermediate frequency provided by the RF front end module. As a result, a base-band signal processing chip may not be applicable to different RF front end chips having different sets of parameters. Therefore, there is a need for a flexible base-band signal processing module whose working frequency can be separate from the sampling frequency provided by the RF frond end module.

Second, to achieve a better performance, parallel correlators are conventionally employed to conduct parallel searches in the acquisition module. However, using a large number of the parallel correlators demands large logic resources and requires high correlation frequency thereby making it hard for the acquisition process to realize in an Application Specific Integrated Circuit (ASIC) if no optimization design is adopted. Thus, there is a need to find a method to realize equivalent parallel correlators with reduced hardware complexity.

Of course, there are some prior arts that introduce the implementation of equivalent parallel correlators. However, these methods generally have some limitations on the working frequency and the sampling frequency. Thus, it is to an improved acquisition module that enables parallel correlation and at the same time enhances the flexibility in different working condition and reduces the hardware complexity the present invention is primarily directed.

SUMMARY OF THE INVENTION

The present invention advantageously provides a method and an apparatus using hybrid correlation technique and a signal preprocessing process to realize equivalent parallel correlators. As a result, the goal of reducing hardware complexity and providing flexible working condition can be achieved.

In one embodiment, there is provided a method for processing spread spectrum signals through a two-step integration process in a circuit having an intermediate frequency signal preprocessing unit and a plurality of block integrators, wherein the circuit receiving a digitized signal, a local reference signal, and a pseudorandom noise code. The method includes generating a plurality of data streams by the intermediate frequency signal preprocessing unit using the digitized signal and the local reference signal, receiving at each block integrator a data stream and the pseudorandom noise code, performing a predetermined number of partial correlations at each block integrator based on the data stream and the pseudorandom noise code to obtain a predetermined number of partial correlation results, and computing a predetermined number of complete correlation results based on the predetermined number of partial correlation results. Each data stream is generated every predetermined time period.

In an alternative embodiment, there is provided a method for processing spread spectrum signals in a circuit having a plurality of block integrators, wherein the circuit receives a digitized signal, a local reference signal and a pseudorandom noise code. The method includes a) receiving at each block integrator a data stream and the pseudorandom noise code with a respective code phase, wherein the data stream has pre-integration results and the pre-integration results being generated by a intermediate frequency signal preprocessing unit at a predetermined rate based on the digitized signal and the local reference signal, b) performing a partial correlation to produce a partial correlation result in each block integrator based on a predetermined number of pre-integration results of the data stream and a segment of the pseudorandom noise code, c) shifting the segment of the pseudorandom noise code by a predetermined position, d) repeating step b) and c) until a first predetermined number of partial correlations are achieved in each block integrator, e) shifting the predetermined number of pre-integration results of the data stream sent to each block integrator after a pre-integration result of the data stream is generated, f) repeating step b) through e) until a second predetermined number of partial correlations are achieved in each block integrator, g) computing a predetermined number of complete correlation results based on the second predetermined number of partial correlation results.

In yet another alternative embodiment, there is also provided an apparatus processing spread spectrum signals digitized at a predetermined sampling frequency. The apparatus includes an intermediate frequency signal preprocessing unit and a plurality of parallel block integrators in communication with the intermediate frequency signal preprocessing unit. The intermediate frequency signal preprocessing unit is capable of generating a first and a second set of data streams using a digitized signal and a first and second reference signals, respectively. Each data stream in each set of data streams is generated every predetermined time period, and each data stream includes pre-integration results generated at a predetermined rate. Each block integrator is capable of receiving a data stream from the first and second set of data streams and a pseudorandom noise code. Each block integrator is also capable of performing a predetermined number of partial correlations based on the data stream and the pseudorandom noise code using a hybrid technique.

In yet another alternative embodiment, there is also provided a receiver for receiving spread spectrum signals. The receiver includes a tuner, an analog-to-digital converter, a signal processing unit for processing the spread spectrum signal, and a storage unit. The tuner is capable of converting the received spread spectrum signal from its original frequency to an intermediate frequency. The analog-to-digital converter coupled to the tuner converts the intermediate frequency signal into a digitized signal at a predetermined sampling frequency. The signal processing unit is coupled to the analog-to-digital converter. The signal processing unit includes an intermediate frequency signal preprocessing unit and a plurality of parallel block integrators in communication with the intermediate frequency signal preprocessing unit. The intermediate frequency signal preprocessing unit is capable of generating a first and a second set of data streams using the digitized signal and a first and a second local reference signals, respectively. Each data stream in each set of data streams is generated every predetermined time period, wherein each data stream in the first and the second set of data streams includes pre-integration results generated at a predetermined rate. Each block integrator is capable of receiving a data stream from the first and the second set of data streams and a pseudorandom noise code, and is also capable of performing a predetermined number of partial correlations based on the data stream and the pseudorandom noise code using a hybrid technique. The signal processing unit further includes a control logic coupled to the storage unit and the plurality of block integrators. The control logic reads a previous partial correlation result from the storage unit, adds current partial correlation result to the previous partial correlation result to produce a modified partial correlation result, and writes the modified partial correlation result back into the storage unit, wherein the previous partial correlation result and the current partial correlation result are a portion of a complete correlation result.

BRIEF DESCRIPTION OF THE DRAWINGS

Features and advantages of embodiments of the invention will become apparent as the following Detailed Description proceeds, and upon reference to the Drawings, where like numerals depict like elements, and in which.

DETAILED DESCRIPTION OF THE INVENTION

Figure 1:
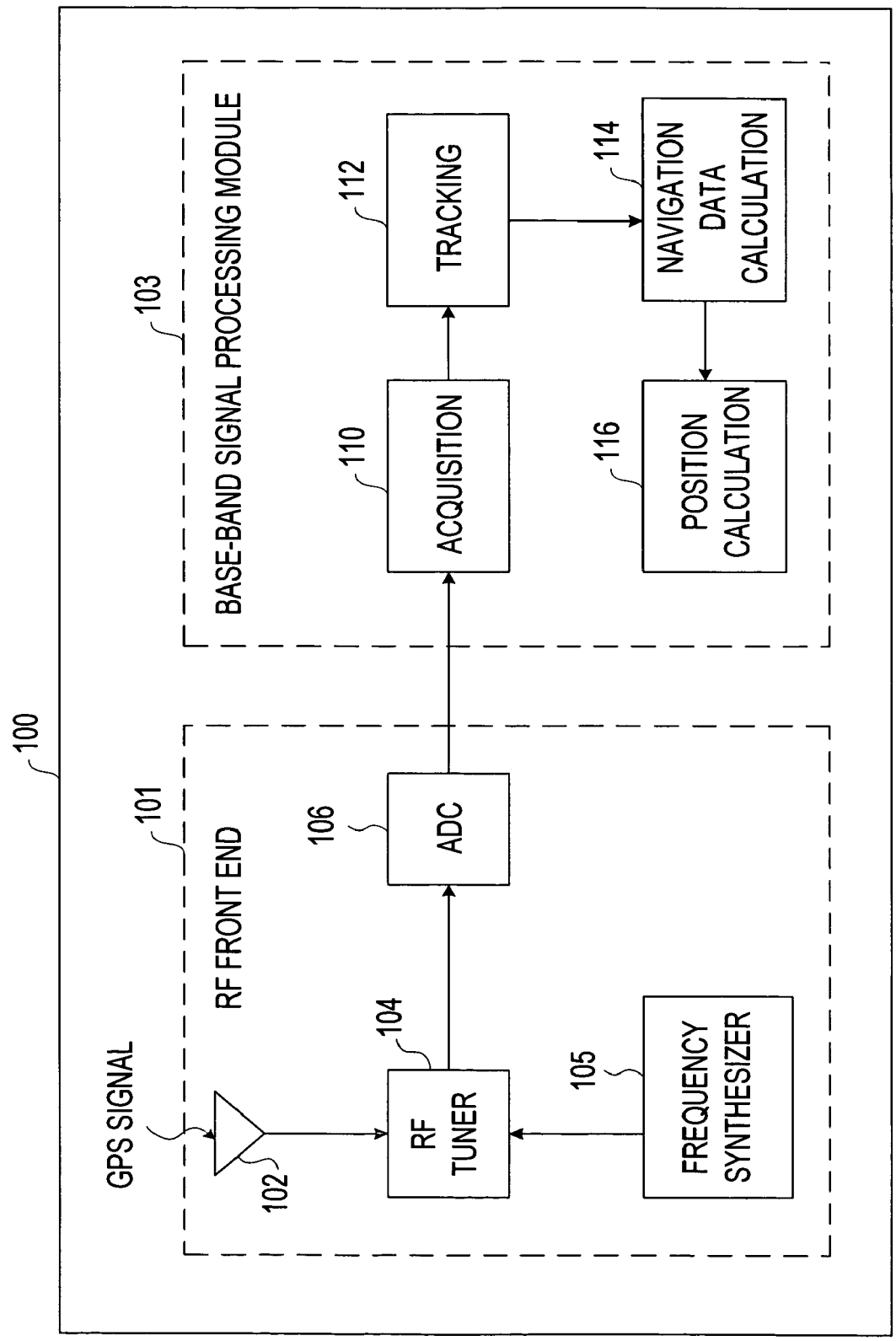
FIG. 1 is a prior art block diagram of a spread spectrum receiver.
Figure 2:
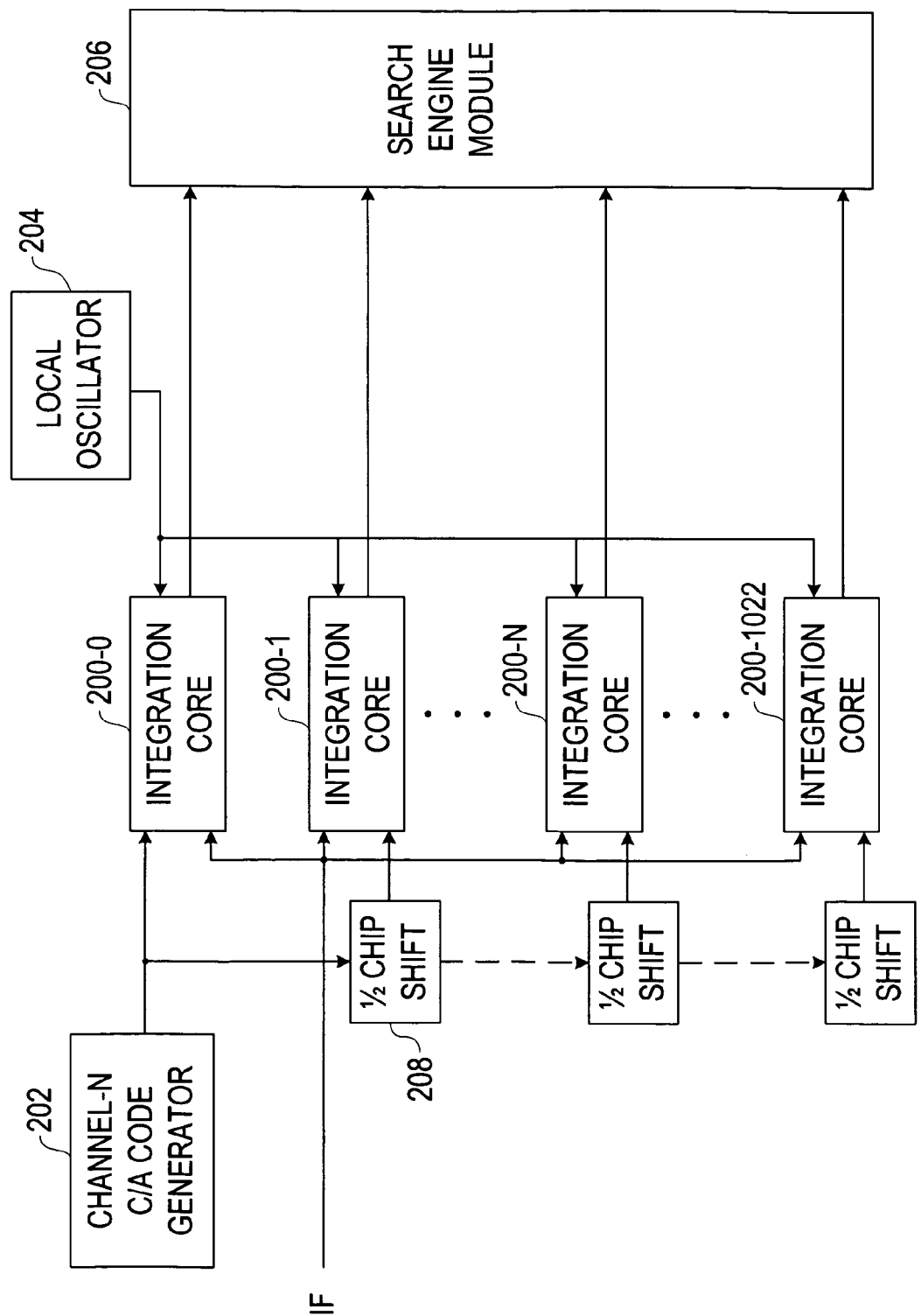
FIG. 2 is architecture of a prior art acquisition module.

FIG. 2 illustrates architecture of a prior art acquisition module for a certain channel. The acquisition module as illustrated in FIG. 2 comprises 1023 parallel integration cores (also known as parallel correlators) numbered consecutively from integration core 200-0 (also known as correlator 0) to integration core 200-1022 (also known as correlator 1022), a channel-N C/A code generator 202 capable of generating C/A codes, a local oscillator 204 capable of generating carrier signals, and a search engine module 206. Each integration core completes a correlation taking an IF signal, a local carrier signal, and a C/A code as inputs. In the integration core 200-0, the correlation operation consists of multiplying the IF signal with the local carrier signal and C/A code. The correlation result is then sent to the search engine module 206. The search engine module 206 decides whether the correlation result has exceeded a predefined threshold and if the particular Doppler frequency shift and the C/A code phase shift have been found. In order to find the beginning point of the C/A code, a common practice is to shift the C/A code by half a chip for each C/A code search. In the integration core 200-1, a similar correlation is performed except that the C/A code sent to integration core 200-1 is shifted by half a chip. The ½ chip shift module 208 is used to shift the C/A code by half a chip. As previously stated, a full period of a C/A code contains 1023 chips. Therefore, for a certain frequency, 2046 correlations are required to cover the phase search of a full period of the C/A code. FIG. 2 shows 1023 correlation cores which cover half period of the C/A code phase search. Therefore, to cover a full period of the C/A code phase search, the IF signal needs to be acquired twice to complete a full acquisition.

Although parallel correlations provide a relatively high speed of acquisition process, in practice, 1023 parallel integrators are hard to realize in hardware. To achieve equivalent parallel integrations, some prior arts either increase the hardware scale or select a high correlation frequency. The present invention provides an advantageous practice to realize a large number of equivalent parallel integrators with reduced hardware complexity. Furthermore, the present invention allows the correlations to be performed at a flexible frequency and has little requirement to the sampling frequency, which means that a base-band signal processing chip can be compatible with different RF front end chips having different sampling frequencies. These merits are on the premises of a hybrid correlation technique, a pre-integration process, and a block integration technique adopted in the present invention. For simplicity, the disclosure herein is mainly focus on how to achieve 1023 equivalent parallel integrators or the effect of 1023 parallel correlators illustrated in FIG. 2. However, it will be appreciated by those skilled in the art that any number of parallel integrators can be achieved using the method detailed herein.

The hybrid correlation mentioned above is a combination of two types of correlation implementations: slip correlation and matched filter correlation. The slip correlation is conducted in a fashion that a PRN code is shifted each time to correlate with the same incoming signal to search for the starting point of the PRN code. The matched filter correlation is conducted in a fashion that the incoming signal is shifted each time to correlate with the same PRN code to search for relative phase shift of the PRN code and thereby finding the starting point of the PRN code. The description of FIG. 4 will further explain the hybrid correlation technique.

Figure 3:
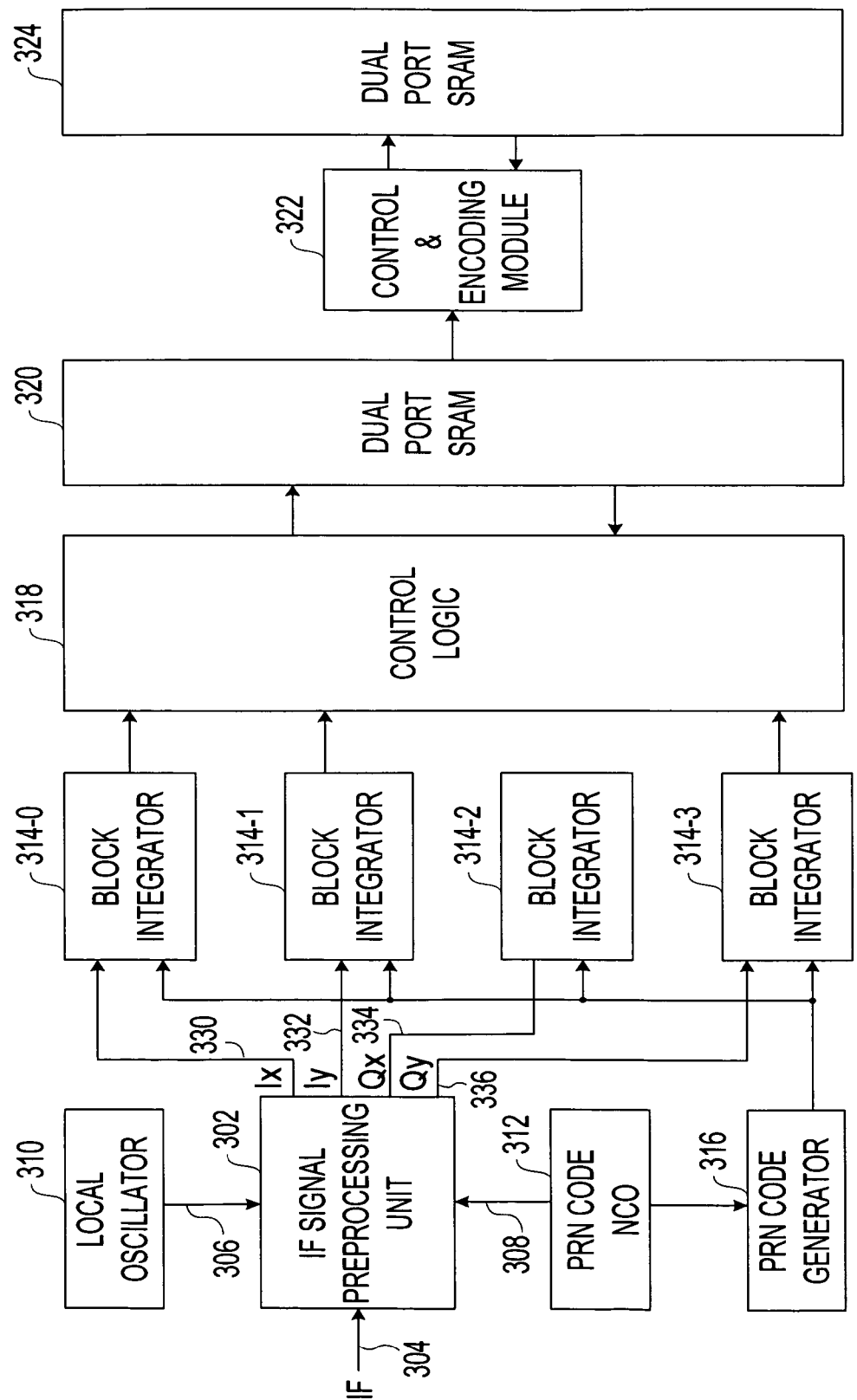
FIG. 3 is an exemplary architecture of an acquisition module according to one embodiment of the invention.

FIG. 3 illustrates an exemplary architecture of an acquisition module 110 according to the invention. An intermediate frequency (IF) signal preprocessing unit 302 receives at least three signals: an input signal (IF signal) 304, a local reference signal (carrier signal) 306 generated by a signal generator (local oscillator) 310, and a clock signal 308 generated by a code clock generator (a PRN code Numerically Controlled Oscillator, also known as PRN code NCO) 312. The IF signal 304 is a digital signal that is digitized by an analog-to-digital converter (not shown) at a sampling frequency. The IF signal preprocessing unit 302 is capable of pre-integrating the IF signal 304 and producing a plurality of data streams. Each data stream includes pre-integration results generated at a frequency much lower than the sampling frequency. These data streams herein are named as Ix 330, Iy 332, Qx 334, and Qy 336. Ix 330 refers to a data stream with in-phase (I) component. Qx 334 refers to the data stream with quadrature (Q) component. Iy 332 refers to a data stream with in-phase component, wherein Iy is generated a predetermined time period after Ix is generated. Qy 336 refers to the data stream with quadrature component, wherein Qy is generated a predetermined time period after Qx is generated.

As previously stated, the IF signal 304 is multiplied by both the local carrier signal 306 and PRN code 308 in the acquisition module. Since the C/A code does not change during the time interval of a code chip, it is desirable to obtain a pre-integration result first by multiplying the IF signal 304 with the local carrier signal 306 within a time interval of a code chip and then later multiply the pre-integration result with the PRN code. If the sampling frequency of the input IF signal 304 is 16.368 MHz, then the IF signal 304 contains 16 data samples within a data length of a chip since the C/A code rate is 1.023 Mega-chips per second. The IF signal preprocessing unit 302 is adapted to multiply the 16 data samples of the IF signal 304 with 16 respective data samples of the carrier signal 306 point by point, and sum up the multiplication products together to produce a pre-integration result. As such, 16-point multiplication is performed at the PRN code rate (1.023 MHz), i.e. the pre-integration results are generated at the PRN code rate. In operation, multiply-accumulator (MAC) unit (not shown in FIG. 3, but shown in FIG. 4) inside the IF signal preprocessing unit 302 are used to perform the pre-integration. The above description describes how a data stream of pre-integration results (e.g. Ix 330), is generated. Of course, the sampling frequency is not limited to 16.368 MHz. The data stream can be generated at the PRN code rate in case of any other suitable sampling frequency.

The PRN code NCO 312 generates a C/A code clock at the C/A code rate. Therefore, the PRN code NCO 312 may be employed to control the generation of pre-integration results at a predetermined rate, such as the C/A code rate.

Advantageously, the IF signal preprocessing unit 302 is capable of converting the input signal (IF signal) into a lower frequency (i.e. PRN code rate). When the preprocessed input signal (also known as the data streams) is generated at the PRN code rate, there will be enough time for each block integrator to perform a predetermined number of correlations in a time division manner rather than performing only one correlation described in FIG. 2 and thus it is possible for the predetermined number of correlations to share the same logic resource. More advantageously, due to the slow generation of the preprocessed input signal, there is enough time for an asynchronous interface (not shown in FIG. 3, but shown in FIG. 4) to perform an asynchronous conversion, thereby allowing the working frequency of the base-band signal processing module to be independent from the sampling frequency. It should be understood by those skilled in the art that correlations are performed at the working frequency.

After the start of Ix 330, the IF signal preprocessing unit 302 begins to generate Iy 332. The time interval between the start of Ix 330 and Iy 332 is a time period of "half a code chip." The phrase "half a code chip" with quotation marks herein is a measurement of time and refers to the duration of half a code chip. Similarly, the time interval between the start of Qx 334 and Qy 336 is also a time period of "half a code chip".

The four data streams are sent to four corresponding block integrators 314-0, 314-1, 314-2, and 314-3 where partial correlations are performed. "Partial correlation" is a calculation of an inner product between a predetermined number of the pre-integration results of a data stream and a segment of the C/A code generated by a PRN code generator 316. By using the hybrid correlation technique, each block integrator is capable of performing a predetermined number of correlations, e.g. 512 correlations. Therefore, each block integrator may be equivalent to 512 correlators in FIG. 2. Block integrator 314-0 may be equivalent to even correlators 0, 2, 4, ... 1022 in FIG. 2. Block integrator 314-1 may be equivalent to odd correlators 1, 3, 5, ... 1021 in FIG. 2. As such, two block integrators 314-0, 314-1 are enough to emulate 1023 correlators if only in-phase (I) channel is considered. Similarly, block integrator 314-2 is equivalent to even correlators 0, 2, 4, ... 1022 in quadrature channel, and block integrator 314-3 is equivalent to odd correlators 1, 3, 5, ... 1021 in quadrature channel. It should be noted that any number of correlations can be obtained in each block integrator as long as an appropriate working frequency is set. The present invention utilizes a hybrid correlation technique to perform a predetermined number of correlations in each block integrator, as will be detailed in FIG. 4.

A control logic 318, as shown in FIG. 3, may also be included in the acquisition module. The control logic 318 may be used to control the calculation of complete correlation results. After the block integrator 314-0, for example, produced one partial correlation result, the control logic 318 reads a previous partial correlation result from a first storage unit (a Dual Port SRAM) 320 coupled to the control logic 318, adds the current partial correlation result to the previous partial correlation result produced by the same block integrator, and writes the sum back to the first storage unit 320. In operation, the control logic 318 receives, in parallel, the partial correlation results from the parallel block integrators [314-0, . . . , 314-3] and performs the same operation described above for the block integrator 314-0. The "previous partial correlation result" refers to a correlation result that can make up of the same complete correlation result if it is added to the current partial correlation result.

The first storage unit (Dual Port SRAM) 320 coupled between the control logic 318 and a control & encoding module 322, as illustrated in FIG. 3, is used to store the partial correlation results and coherent integration results. Coherent integration is an operation that accumulates similar results from individual correlations over a time period to improve the signal to noise ratio and enhance the ability of the receiver to detect weak signals. Each block integrator may perform coherent integrations within a predetermined data length.

A control & encoding module 322 coupled between the first storage unit 320 and a second storage unit 324 is adapted to process the results of coherent integration from the first storage unit 320 and send the processed results to the second storage unit 324. The control & encoding module 322 may perform the following operations: encoding the coherent integration results and further processing the signals, and performing non-coherent integration that is used to increase the signal strength in case of a weak signal.

Figure 4:
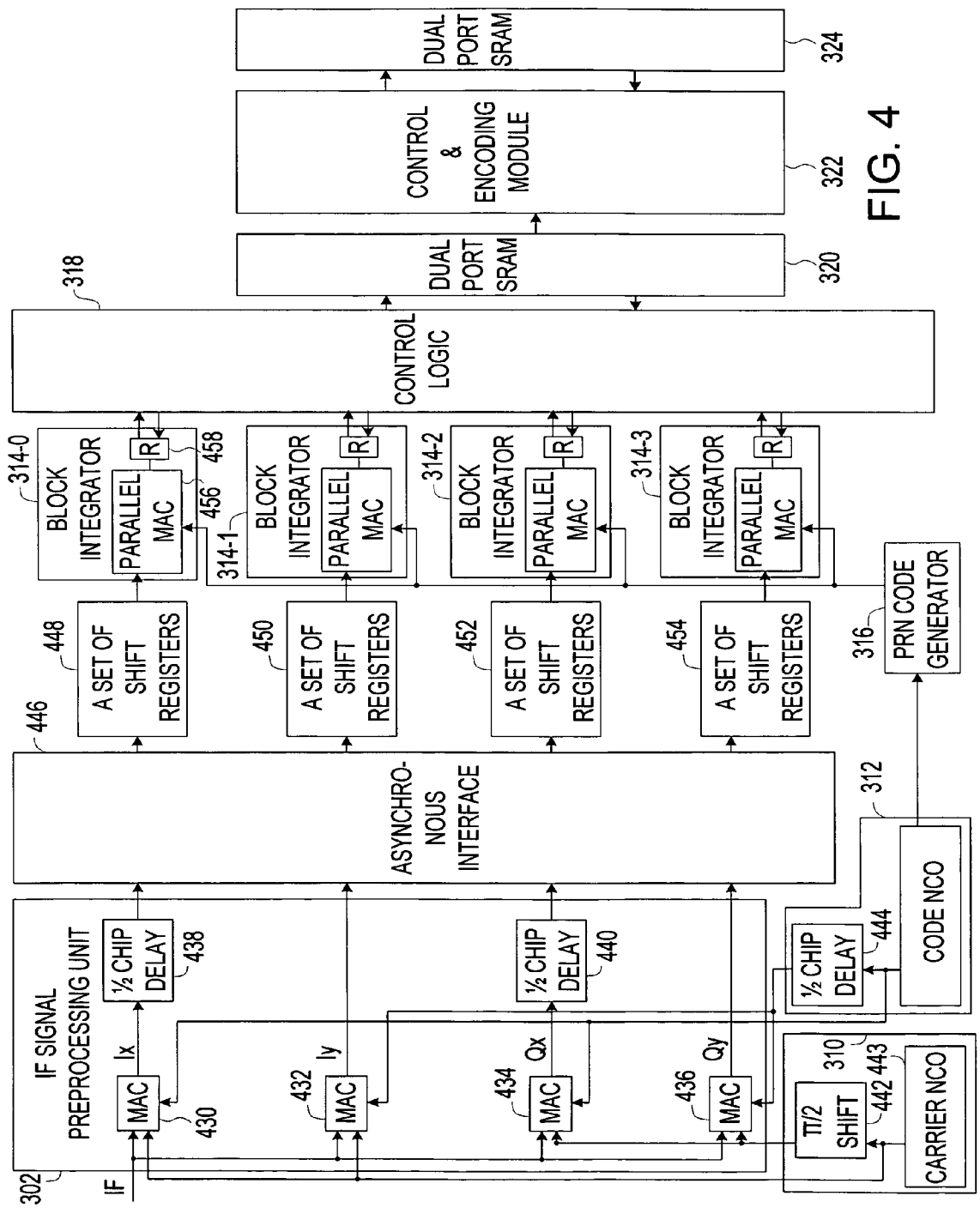
FIG. 4 is a detailed exemplary block diagram of the acquisition module of FIG. 3.

FIG. 4 illustrates a detailed architecture of the acquisition module 110 of FIG. 3. A signal generator 310 includes a carrier NCO 443 and a $\pi/2$ phase shift module 442. The signal generator 310 is capable of generating two orthogonal carrier signals: a sinusoidal signal and a cosinoidal signal. One of the two carrier signals (also known as a first local reference signal) is generated by the carrier NCO 443. The other carrier signal (also known as a second local reference signal) is obtained by shifting the first local reference signal. The shifting operation is performed by a $\pi/2$ phase shift module 442. An IF signal preprocessing unit 302 comprises four multiply-accumulator (MAC) units 430, 432, 434, and 436 and two ½ chip delay modules 438 and 440. The first multiply-accumulator (MAC) unit 430 is adapted to perform pre-integration based upon the sinusoidal signal and the IF signal and to produce Ix at the PRN code rate. The second multiply-accumulator (MAC) unit 432 is adapted to perform pre-integration based upon the sinusoidal signal and the IF signal and to produce Iy at the PRN code rate. As previously stated, the start of Iy is "half a code chip" later than the start of Ix, therefore, the data contained in IF signal and the sinusoidal signal sent to MAC 432 are "half a code chip" later than the data sent to MAC 430. Similarly, the third multiply-accumulator (MAC) unit 434 is adapted to perform pre-integration based upon the cosinoidal signal and the IF signal and to produce Qx at the PRN code rate. The fourth multiply-accumulator (MAC) unit 436 is adapted to perform pre-integrations based upon the cosinoidal signal and the IF signal and to produce Qy at the PRN code rate. The start of Qy is "half a code chip" later than the start of Qx, therefore, the data contained in IF signal and the cosinoidal signal sent to MAC 436 are "half a code chip" later than the data sent to MAC 434. Each MAC also receives a clock signal generated by a code clock generator 312 such that the MAC 430, 432, 434 and 436 are controlled to generate respective data stream at the PRN code rate. Since the start of Iy and Qy is "half a code chip" later than the start of Ix and Qx, a ½ chip delay module 444 is then used to delay the start of Iy and Qy. Since the partial correlations in the present embodiment are performed simultaneously in each block integrator, ½ chip delay module 438 and 440 are employed to offset the time difference among the four data streams.

An asynchronous interface 446 coupled to the IF signal preprocessing unit 302 are used to perform asynchronous conversion in order to separate the working frequency and the sampling frequency. As a result, the correlation can be done at any suitable frequency regardless of the sampling frequency. In other words, the base-band signal processing module is thus able to support a wide range of related parameters provided by the RF front end, such as the sampling frequency. The asynchronous interface 446 can be realized with conventional knowledge by those skilled in the art.

After the asynchronous conversion, the four data streams are sent to four sets of shift registers 448, 450, 452, and 454 respectively. Each set of shift registers is adapted to store and shift the pre-integration results of each data stream. Since the pre-integration results of each data stream are generated at PRN code rate, the data in the set of shift registers are updated at the PRN code rate. The capacity of each set of shift registers used herein is configured to store 33 pre-integration results. Of course, any set of shift registers with suitable capacity may also be utilized. For example, in one embodiment, a set of shift registers may be configured to store 11 pre-integration results.

Block integrators 314-0, 314-1, 314-2, and 314-3 coupled to four sets of shift registers 448, 450, 452, and 454 respectively are capable of performing partial correlations. Each block integrator includes a parallel multiply-accumulator (parallel MAC) unit and a register. Block integrators 314-0 and 314-2 are adapted to emulate even correlators in FIG. 2. Block integrator 314-1, 314-3 are adapted to emulate odd correlators in FIG. 2. Since the operation in each block integrator is substantially the same. The following description will focus on the operation in the block integrator 314-0. As illustrated in FIG. 4, the block integrator 314-0 coupled to the set of shift registers 448 reads the data (e.g. 33 pre-integration results) in the set of shift registers 448 and receives a segment of C/A code (e.g. 33 C/A code chips) generated from a PRN code generator 316. A parallel multiply-accumulator (parallel MAC) unit 456 in the block integrator 314-0 is capable of calculating an inner product (also referred to as partial correlation result) between the 33 pre-integration results and 33 C/A code chips in a clock cycle (i.e. the reciprocal of working frequency) and also capable of adding the partial correlation results to a previous partial correlation result. The "parallel multiply-accumulator (parallel MAC)" used herein refers to a MAC that is capable of performing multiplications in parallel and summing up these multiplication results at a time and also capable of accumulating the partial correlation results. Advantageously, the computation of multiplication in correlation calculation by the parallel MAC unit is a simple symbolic calculation because there are only two states of the C/A code: +1 and −1. The block integrator 314-0 also includes a storage register 458 coupled between the parallel MAC unit 456 and a control logic 318. The storage register 458 is adapted to store the previous partial correlation result from a first storage unit (Dual Port SRAM) 320 and controlled to send the previous partial correlation result to the parallel MAC 456. Additionally, the storage register 458 is also adapted to store the modified partial correlation result from the parallel MAC unit 456 and controlled to send it to the dual port SRAM 320.

Figure 5:
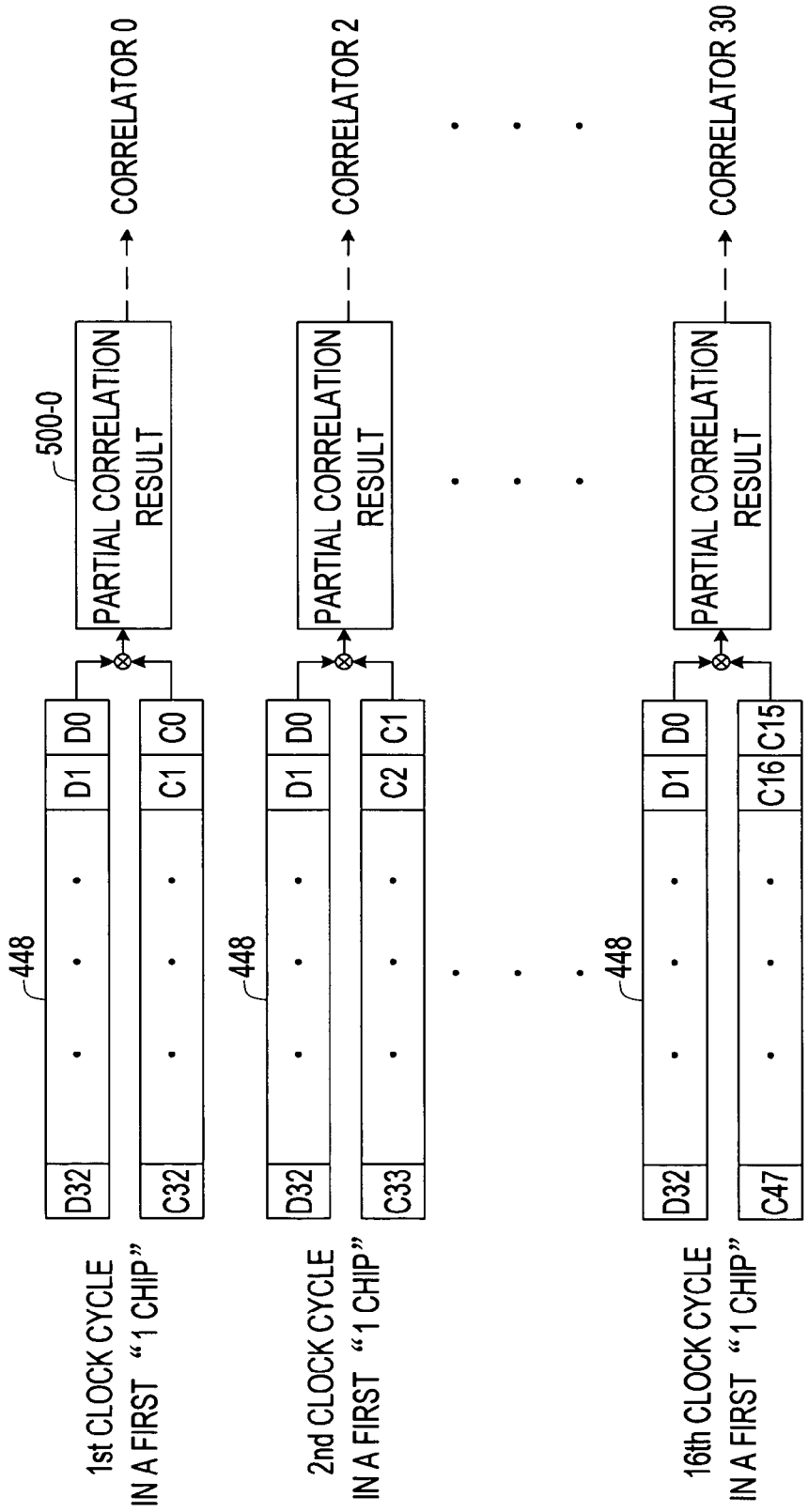
FIG. 5 illustrates the correlations completed in a block integrator within a first "1 chip;"

FIG. 5 illustrates how a predetermined number of partial correlations are completed in the block integrator 314-0 within a first "1 chip." The phrase "1 chip" with quotation marks herein is a measurement of time and refers to the duration of a code chip. "Dx" in FIG. 5 refers to a pre-integration result sent to the set of shift registers 448. "Cx" in FIG. 5 refers to a C/A code chip generated by the PRN code generator 316 in FIG. 4. In a first clock cycle in the "1 chip", the data [D32 . . . D0] in the set of shift registers 448 is multiplied by 33 C/A code [C32 . . . C0] point by point (i.e. D0*C0+D1*C1+ . . . +D32*C32) to produce a partial correlation result 500-0. The operation in the first clock cycle may be equivalent to correlator 0 as illustrated in FIG. 2. After a partial correlation result 500-0 is generated, the PRN code generator 316 in FIG. 4 will shift the C/A code by a chip. After the C/A code is shifted by a chip, the block integrator 314-0 in FIG. 4 starts a next partial correlation taking the same 33 pre-integration results [D32 . . . D0] and the shifted C/A code [C33 . . . C1] as inputs and adding the current partial correlation result to a corresponding previous correlation result if the previous correlation is present. Because the C/A code is shifted by a chip rather than half a chip, the partial correlation is equivalent to correlator rather than correlator 1 in FIG. 2. The block integrator 314-0 repeats the above-mentioned step to produce a predetermined number of partial correlations during the time period of "1 chip." The above-mentioned procedure is called slip correlation, because the pre-integration results in the set of shift registers remain unchanged while the C/A code "slips" by a chip each time to perform a partial correlation. The number of partial correlations performed in "1 chip" is determined by the working frequency. Because of the use of the asynchronous interface 446, it makes it possible for the working frequency to be detached from the sampling frequency, the working frequency may be set at any possible value and thus the block integrator may perform any number of correlations within the time period of "1 chip" as long as the working frequency permits. In the present embodiment, the block integrator 314-0 is adapted to complete 16 partial correlations within the time period of "1 chip." Consequently, the block integrator 314-0 is capable of being equivalent to 16 even correlators numbered correlator 0, correlator 2, . . . , correlator 30 in a first "1 chip" as depicts in FIG. 5.

Figure 6:
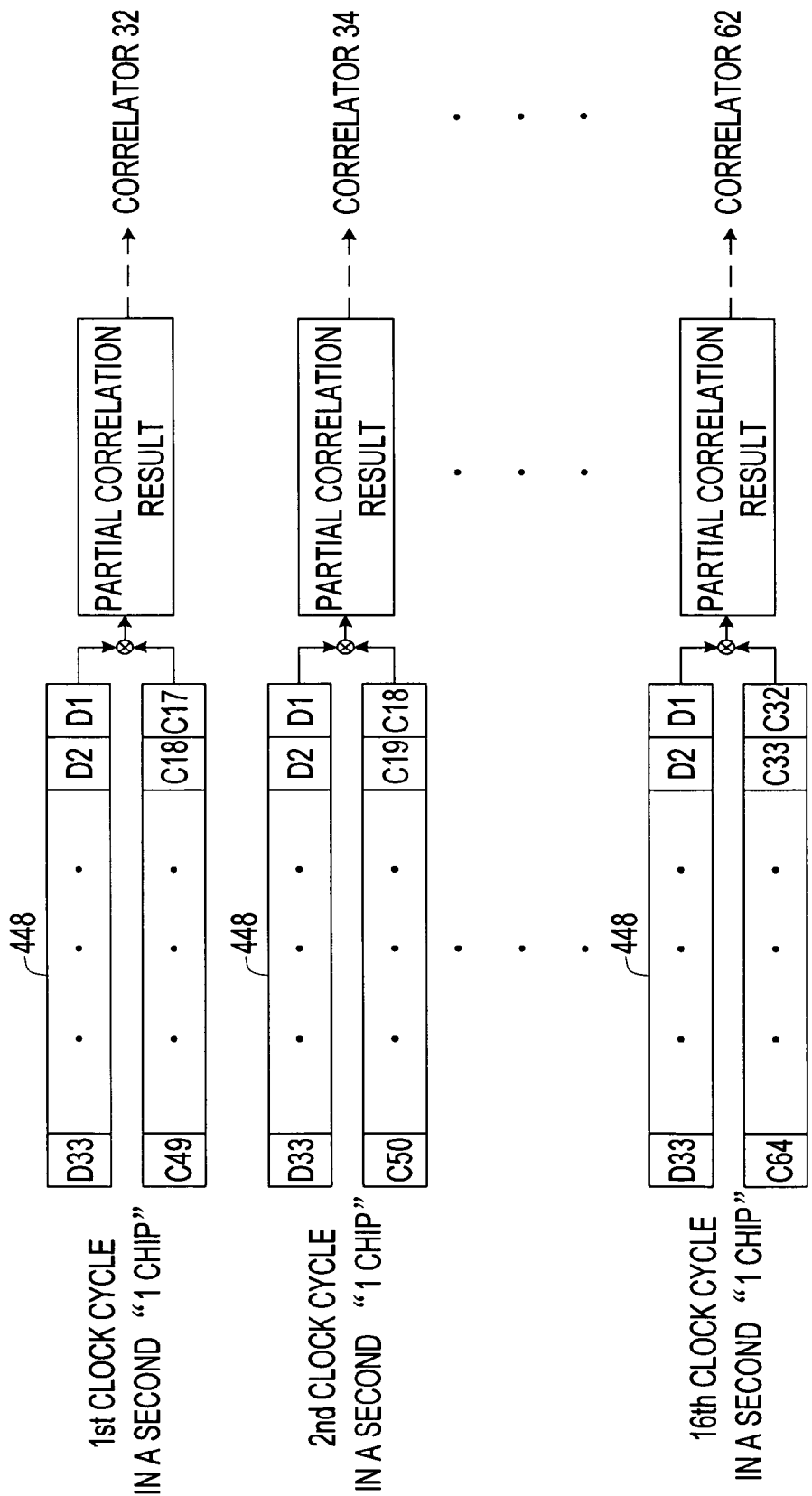
FIG. 6 illustrates the correlations completed in a block integrator within a second "1 chip;"

FIG. 6 illustrated the correlations completed in the block integrator 314-0 in a second "1 chip." In this time period of "1 chip", the block integrator 314-0 is aimed to be equivalent to even correlators 32, 34 . . . 62 in FIG. 2. Once a next pre-integration result is generated from the IF signal preprocessing unit 302 in FIG. 4, the data in the set of shift registers 448 is shifted by a pre-integration result. However, because the 33 pre-integration results is shifted by a pre-integration result (shown as [D33 . . . D1]), the C/A code should skip a chip (shown as [C49 . . . C17] rather than [C48 . . . C16]) in order to be equivalent to correlator 32. In the next clock cycle, the PRN code generator 316 in FIG. 4 shifts the C/A code by a chip. The partial correlation is performed using the same pre-integration results [D33 . . . D1] and the shifted C/A code [C50 . . . C18] as inputs. As such, 16 pre-integration results are obtained in this time period of "1 chip". It can be deduced that the block integrator 314-0 is capable of performing 512 (32*16) partial correlations within the time period of "32 chip." The phrase "32 chip" with quotation marks herein is a measurement of time and refers to the duration of 32 code chip. As a result, the block integrator 314-0 is equivalent to 512 even correlators numbered correlator 0, 2, . . . 1022.

On the whole, the data in the set of shift registers 448 is "moving" at the rate of PRN code rate. The block integrator 314-0 uses different shifted pre-integration results to do the correlations when each time period of "1 chip" passes. The procedure resembles the principle of matched filter correlation technique. However, during a time period of "1 chip," the correlations are completed using slip correlation technique as stated previously. Therefore, the technique used in present invention can be regarded as a hybrid correlation technique combining both matched filter correlation technique and slip correlation technique. Advantageously, the adoption of hybrid correlation technique may reduce the hardware complexity in base-band signal processing module design because the technique helps to reduce the storage space. For instance, if only slip correlation technique is adopted, the pre-integration results will not be sent to the block integrator to perform the correlations until a set of 33 totally new pre-integration results are all collected. Therefore, two sets of registers are needed. One is to store the current set of 33 pre-integration results which takes part in the calculation of a partial correlation while the other one is to store the incoming set of 33 new pre-integration results which is being produced by the IF signal preprocessing unit. However, by using the hybrid correlation technique, especially the matched filter technique, only one set of shift registers is needed, as detailed above.

Figure 7:
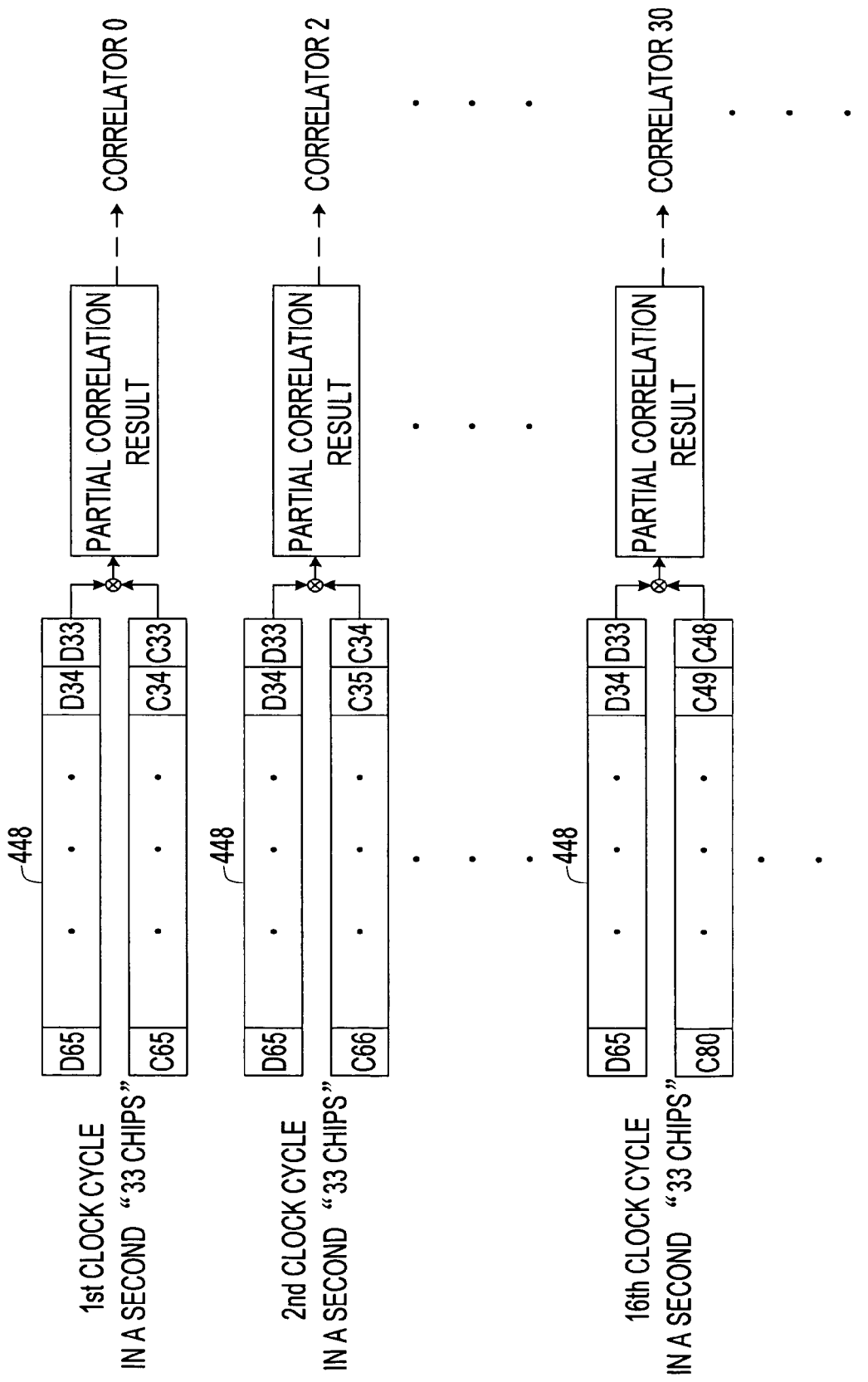
FIG. 7 illustrates some correlations completed in a block integrator in a second "33 chips.

However, the above-mentioned 512 partial correlations are only portions of 512 complete correlations. A complete correlation requires 1023 pre-integration results to multiply by 1023 C/A code chips. For example, a complete correlation done by correlator 0 is based on a formula: D0*C0+D1*C1+ . . . +D1022*C1022. The partial correlation result 500-0 in FIG. 5 is calculated based on the 33 pre-integration results and 33 C/A code chips using a formular:D0*C0+D1*C1+ . . . +D32*C32. Therefore, the 1023 pre-integrations or 1023 C/A code chips need to be divided into 31 (1023/33) blocks. After a time period of a first "33 chips" passes, the partial correlation performed in a first clock cycle of a second "33 chips" should still be a portion of complete correlation done by correlator 0. But the inputs are changed to [D65 . . . D33] and [C65 . . . C33], as illustrated in FIG. 7. FIG. 7 illustrated some correlations completed in the block integrator 314-0 in a second "33 chips." The phrase "33 chip" with quotation marks herein is a measurement of time and refers to the duration of 33 code chip. When the partial correlation is done, the parallel MAC 456 also adds the partial correlation results to a previous partial correlation result 500-0 shown in FIG. 5. The rest of the complete correlation result corresponding to correlator 0 may be deduced by analogy.

As a matter of fact, in a time period of "33 chips," 528 partial correlations (33*16) can be completed, but only 512 (32*16) partial correlations are needed. Therefore, the calculation of partial correlations should be stopped in the last "1 chip" during a time period of "33 chips." However, because a complete correlation is divided into 31 blocks with 33 pre-integration results and 33 C/A code chips in each block, a new pre-integration result should still be sent to the set of shift register in the last "1 chip" during the time period of "33 chips" to ensure the next time period of "33 chips" starts with 33 totally new pre-integration results.

Returning to FIG. 4, the block integrator 314-1 is adapted to emulate odd correlators numbered correlator 1, 3, . . . ,1021 in FIG. 2. The method used in block integrator 314-1 is substantially the same as the one used in the block integrator 314-0. The block integrator 314-0 and 314-1 handle in-phase signal. The block integrator 314-2 is adapted to emulate even correlators numbered correlator 0, 2, . . . ,1022 in FIG. 2, while the block integrator 314-3 is adapted to emulate odd correlators numbered correlator 1, 3, . . . , 1021 in FIG. 2. The method used in these two block integrators is substantially the same as the one used in the block integrator 314-0. The block integrator 314-2 and 314-3 handle quadrature signal.

The PRN code generator 316 generates parallel C/A code at the C/A code rate and sends the same C/A code to block integrator 314-0, 314-1, 314-2, and 314-3. The generation rate is controlled by a clock signal produced by the code clock generator (PRN code NCO) 312.

The control logic 318 and the first storage unit (a dual port SRAM) 320, a control & encoding module 322 and a second storage unit (a dual port SRAM) 324 in FIG. 4 are identical with those of FIG. 3. Hence, any repetitive description of such components is omitted herein for clarity.

Figure 8:
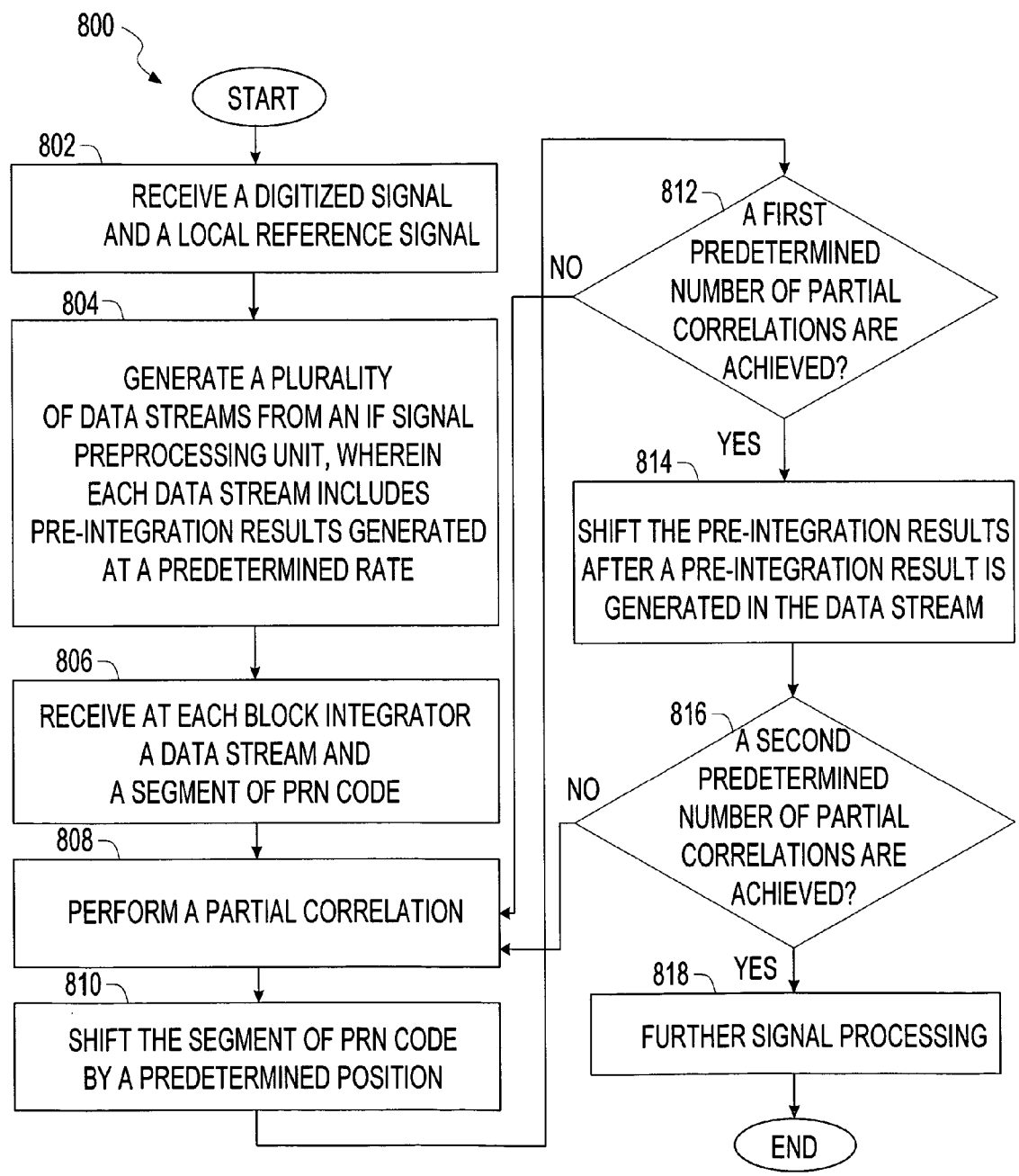
" and FIG. 8 is an exemplary flowchart for processing spread spectrum signals according to one embodiment of the invention.

FIG. 8 illustrates a flowchart 800 for processing spread spectrum signal in a circuit having an IF signal preprocessing unit and a plurality of block integrators, wherein the circuit receiving an input signal digitized at a predetermined sampling frequency, a local reference signal and a pseudorandom noise code. It should be noted that the method focuses on the in-phase channel signal processing. The method used in the quadrature channel signal processing is substantially the same as the method used in in-phase channel signal processing. After the IF signal preprocessing unit receives a digitized signal and a local reference signal, step 802, the IF signal preprocessing unit generates a plurality of data streams, wherein each data stream is generated every predetermined time period and each data stream includes pre-integration results which are generated at a predetermined rate (e.g. the PRN code chip rate) based upon the received digitized signal and the local reference signal, step 804. After generating the data streams, each block integrator receives a data stream and a segment of the PRN code, step 806. Then, each block integrator performs a partial correlation based on a predetermined number of pre-integration results of the data stream and a segment of the PRN code, step 808. After a partial correlation is completed, the segment of the PRN code sent to each block integrator is shifted by a predetermined position, step 810. After the PRN code is shifted, it is checked if a first predetermined number (e.g. 16) of partial correlations have been achieved in each block integrator, step 812. If the first predetermined number (e.g. 16) of partial correlations are not achieved at each block integrator, the process repeats step 808 through step 810; otherwise the predetermined number of pre-integration results achieved by each block integrator is shifted after a pre-integration result of the data stream is generated, step 814. After the first predetermined number of partial correlations are performed, it is checked if a second predetermined number of partial correlations are achieved in each block integrator, step 816. The process repeats step 810 through step 816 until the second predetermined number of partial correlations are achieved in each block integrator. The second predetermined number of partial correlations will be used for further signal processing, step 818.

In the context of FIG. 8, the method may also be implemented, for example, by operating portion(s) of a computing device to execute a sequence of machine-readable instructions. Though the steps are illustrated in sequence, the method may be implemented in difference sequence or as an event driven process. The instructions can reside in various types of signal-bearing or data storage primary, secondary, or tertiary media. The media may comprise, for example, RAM (not shown) accessible by, or residing within, the components of computing device. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

It should be appreciated by those skilled in the art that the PRN code is not limited to the C/A code, other types of the PRN code may also be used. Additionally, the number of block integrators is not limited to four block integrator as presented in the above-mentioned embodiment. Each data stream may be sent to one or more block integrators. For example, the data stream Ix may be sent to two parallel block integrators, the first block integrator may be equivalent to even correlators 0, 2, . . . 510, the second block integrator may be equivalent to even correlators 512, 514, . . . , 1022.

Of course, the data streams generated by the IF signal preprocessing unit are not limited to four data streams. The time interval between the generation of the data streams of I or Q channels is a function of "½ PRN code chip." The time interval can be the duration of ¼ PRN code chip, ⅛ PRN code chip, and so on. For example, in order to improve the search precision of PRN code, in some embodiments, the data streams can be generated every "¼ chip" in I or Q channel, which means eight data streams can be generated by the IF signal preprocessing unit. Accordingly, the number of MAC, the number of block integrators, the number of sets of shift registers may be changed since there are now eight data streams. The phrase "¼ chip" with quotation marks herein is a measurement of time and refers to the duration of ¼ code chip.

The pre-integration results mentioned in the above mentioned embodiments are generated at the PRN rate. However, in alternative embodiments, the pre-integration results may be generated at a rate which is a function of the PRN code rate. The pre-integration results may be generated at twice the PRN code rate, four times the PRN code rate, and so on. For example, a MAC in the IF signal preprocessing unit may generate the pre-integration results of a data stream at twice the PRN code rate. Consequently, two data streams (Ix, Iy or Qx, Qy) in I or Q channel may be generated every "¼ chip". Of course, more data streams can be generated in I or Q channels in this example depending on the time interval between the generation of Ix and Iy (or Qx and Qy). For example, four data streams may also be generated every "⅛ chip" in I or Q channel.

Furthermore, in some embodiments, the IF signal preprocessing unit may generate only one data stream. The pre-integration results contained in the data stream may be generated at a predetermined rate. The predetermined rate can be a function of PRN code rate, such as PRN code rate, twice PRN code rate, four times PRN code rate and so on. The data stream may be sent to a plurality of block integrator. Each block integrator may be equivalent to a plurality of correlators using hybrid correlation technique described above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method for processing spread spectrum signals through a two step integration process in a circuit having an intermediate frequency signal preprocessing unit and a plurality of block integrators, wherein the circuit receiving a digitized signal, a local reference signal, and a pseudorandom noise code, comprising the steps of:
   a) generating a plurality of data streams by the intermediate frequency signal preprocessing unit using the digitized signal and the local reference signal, wherein each data stream is generated every predetermined time period includes pre-integration results generated by the intermediate frequency signal preprocessing unit at a predetermined rate;
   b) receiving at each block integrator a data stream and the pseudorandom noise code;
   c) obtaining a partial correlation by performing multiplication and addition calculations based on a predetermined number of pre-integration results of the data stream and a segment of the pseudorandom noise code;
   d) shifting the segment of the pseudorandom noise code by a predetermined position;
   e) repeating step c) and d) until a second predetermined number of partial correlations is achieved in each block integrator;
   f) shifting the predetermined number of pre-integration results received by each block integrator after a pre-integration result of the data stream is generated; and
   g) repeating step c) through f) until the first predetermined number of partial correlations is achieved in each block integrator;
   h) performing a first predetermined number of partial correlations at each block integrator based on the data stream and the pseudorandom noise code to obtain a first predetermined number of partial correlation results; and
   i) computing a predetermined number of complete correlation results based on the first predetermined number of partial correlation results; wherein the generation of a pre-integration result further comprising the steps of: multiplying each data point of the digitized signal by each respective data point of the local reference signal to produce multiplication results; and adding the multiplication results to produce a pre-integration result within a data length.

2. The method of claim 1, wherein the predetermined rate is a function of a pseudorandom noise code rate.

3. The method of claim 1, wherein the predetermined time period is a function of the duration of half a pseudorandom noise code chip.

4. The method of claim 1, wherein the predetermined position is a phase shift based on the pseudorandom noise code chip.

5. The method of claim 1, wherein the digitized signal is an intermediate frequency signal converted from a spread spectrum signal.

6. The method of claim 1, wherein the local reference signal is a local carrier signal.

7. The method of claim 1, wherein the pseudorandom noise code is a Coarse/Acquisition code.

8. The method of claim 1, wherein the data length is a function of a pseudorandom code chip length.

9. A method for processing spread spectrum signals in a circuit with a plurality of block integrators, the circuit utilizing a digitized signal, a local reference signal and a pseudorandom noise code, the method comprising the steps of:
   a) receiving at each block integrator a data stream and the pseudorandom noise code with a code phase, wherein the data stream includes pre-integration results and the pre-integration results is generated by a intermediate frequency signal preprocessing unit at a predetermined rate based on the digitized signal and the local reference signal;
   b) performing a partial correlation to produce a partial correlation result in each block integrator based on a predetermined number of pre-integration results of the data stream and a segment of the pseudorandom noise code;
   c) shifting the segment of the pseudorandom noise code by a predetermined position;
   d) repeating step b) and c) until a first predetermined number of partial correlations are achieved in each block integrator;
   e) shifting the pre-integration results of the data stream sent to each block integrator after a pre-integration result of the data stream is generated;
   f) repeating step b) through e) until a second predetermined number of partial correlations are achieved in each block integrator; and
   g) computing a predetermined number of complete correlation results based on the second predetermined number of partial correlation results; wherein the generation of a pre-integration result of the data stream comprising the steps of: multiplying each data point of the digitized signal by each respective data point of the local reference signal to produce multiplication results; and adding the multiplication results to produce a pre-integration result within a data length.

10. The method of claim 9, wherein the digitized signal is an intermediate frequency signal converted from a spread spectrum signal.

11. The method of claim 9, wherein the local reference signal is a local carrier signal.

12. The method of claim 9, wherein the pseudorandom noise code is a Coarse/Acquisition code.

13. The method of claim 9, wherein the data length is a function of a pseudorandom code chip length.

14. The method of claim 9, wherein the predetermined rate is a function of a pseudorandom noise code rate.

15. The method of claim 9, wherein the predetermined position is a phase shift based on a pseudorandom code chip.

16. The method of claim 9, wherein the partial correlation is multiplication and addition calculations based on the predetermined number of pre-integration results of the data stream and a segment of the pseudorandom noise code.

17. An apparatus for processing spread spectrum signals digitized at a predetermined sampling frequency, comprising:
an intermediate frequency signal preprocessing unit being capable of generating a first and a second set of data streams using a digitized signal and a first and second local reference signals, respectively, each data stream in each set of data streams being generated every predetermined time period, wherein each data stream in the first and second set of data streams includes pre-integration results generated at a predetermined rate;
a plurality of block integrators in communication with the intermediate frequency signal preprocessing unit, each block integrator being capable of receiving a data stream in the first and second set of data streams and a pseudorandom noise code and also being capable of performing a first predetermined number of partial correlations based on the data stream and the pseudorandom noise code; and
a plurality of sets of shift registers, each set of shift registers in communication with the intermediate frequency signal preprocessing unit and at least one block integrator of the plurality of block integrators, wherein each set of shift registers is capable of storing a predetermined number of pre-integration results of a data stream from the first and second set of data streams and further capable of shifting the predetermined number of pre-integration results after a pre-integration result of the data stream is generated by the intermediate frequency signal preprocessing unit; wherein the intermediate frequency signal preprocessing unit further comprising: a first set of multiply-accumulator units, each multiply-accumulator unit in the first set of multiply-accumulator units being capable of generating the pre-integration results of a data stream, wherein each pre-integration result is generated by multiplying each data point of the digitized signal by a respective data point of the first local reference signal to produce multiplication results and summing the multiplication results within a data length; and a second set of multiply-accumulator units, each multiply-accumulator unit in the second set of multiply-accumulator units being capable of generating the pre-integration results of a data stream, wherein each pre-integration result is generated by multiplying each data point of the digitized signal by a respective data point of the second local reference signal to produce multiplication results and summing the multiplication results within the data length.

18. The apparatus of claim 17, wherein the predetermined rate is a function of a pseudorandom noise code rate.

19. The apparatus of claim 17, wherein the predetermined time period is a function of the duration of half a pseudorandom noise code chip.

20. The apparatus of claim 17, further comprising a code clock generator coupled to the intermediate frequency signal preprocessing unit for controlling the pre-integration results of each data stream to be generated at the predetermined rate.

21. The apparatus of claim 20, further comprising a code generator coupled to the code clock generator for generating a plurality of pseudorandom noise codes and sending each of the plurality of the pseudorandom noise codes to each block integrator.

22. The apparatus of claim 17, further comprising a signal generator in communication with the intermediate frequency signal preprocessing unit for generating the first and the second local reference signals, wherein the first local reference signal is orthogonal of the second local reference signal and the first and the second local reference signal are local carrier signals.

23. The apparatus of claim 17, wherein the data length is a function of a pseudorandom code chip length.

24. The apparatus of claim 17, wherein for each shift of a set of shift registers, each block integrator being capable of performing a second predetermined number of partial correlations, wherein each partial correlation is performed based on the predetermined number of pre-integration results in the set of shift registers and a shifted segment of the pseudorandom noise code, the segment of the pseudorandom noise code being shifted by a predetermined position.

25. The apparatus of claim 24, wherein the predetermined position is a phase shift based on a pseudorandom code chip.

26. The apparatus of claim 24, wherein after a plurality of shifting of the set of shift registers, each block integrator is capable of performing the first predetermined number of partial correlations.

27. The apparatus of claim 17, wherein each of the block integrators further comprising a parallel multiply-accumulator unit for performing the partial correlation, wherein the partial correlation is obtained by performing multiplication and addition calculations based on the predetermined number of the pre-integration results of the data stream and a corresponding segment of the pseudorandom noise code.

28. The apparatus of claim 17 further comprising:
a control logic in communication with the plurality of block integrators and a storage unit for reading a previous partial correlation result from the storage unit, adding a current partial correlation result to the previous partial correlation result to produce a modified partial correlation result, and writing the modified partial correlation result back into the storage unit, wherein the previous partial correlation result and the current partial correlation result are a portion of a complete correlation result.

29. The apparatus of claim 17, further comprising an asynchronous interface coupled between the intermediate frequency signal preprocessing unit and the plurality of sets of shift registers, the asynchronous interface being capable of separating the sampling frequency and a working frequency, wherein each partial correlation is performed at the working frequency.

30. The apparatus of claim 17, wherein the digitized signal is digitized by an analog-to-digital converter at the predetermined sampling frequency.

31. The apparatus of claim 17, wherein the pseudorandom noise code is a Coarse/Acquisition code.

32. A receiver for receiving spread spectrum signals, comprising:

a tuner for converting a received spread spectrum signal from as original frequency to an intermediate frequency;

an analog-to-digital converter coupled to the tuner for converting the intermediate frequency signal into a digitized signal at a predetermined sampling frequency;

a storage unit for storing calculation results;

a signal processing unit coupled to the analog-to-digital converter for processing the digitized signal, including:

an intermediate frequency signal preprocessing unit being capable of generating a first and a second set of data streams using the digitized signal and a first and second local reference signals, respectively, each data stream in each set of data streams being generated every predetermined time period, wherein each data stream in the first and second set of data streams includes pre-integration results generated at a predetermined rate;

a plurality of block integrators in communication with the intermediate frequency signal preprocessing unit, each block integrator being capable of receiving a data stream in the first and second set of data streams and a pseudorandom noise code and also being capable of performing a first predetermined number of partial correlations based on the data stream and the pseudorandom noise code;

a control logic coupled to the storage unit and the plurality of block integrators for reading a previous partial correlation result from the storage unit, adding current partial correlation result to the previous partial correlation result to produce a modified partial correlation result, and writing the modified partial correlation result back into the storage unit, wherein the previous partial correlation result and the current partial correlation result are a portion of a complete correlation result; and a plurality of sets of shift registers, each set of shift registers in communication with the intermediate frequency signal preprocessing unit and at least one of the plurality of block integrators, wherein each set of shift registers is capable of storing a predetermined number of pre-integration results of a data stream in the first and second set of data streams and shifting the predetermined number of pre-integration results after a pre-integration result of the data stream is generated by the intermediate frequency signal preprocessing unit; wherein the intermediate frequency signal preprocessing unit further comprising: a first set of multiply-accumulator units, each multiply-accumulator unit in the first set of multiply-accumulator units being capable of generating the pre-integration results of a data stream, wherein each pre-integration result is generated by multiplying each data point of the digitized signal by a respective data point of the first local reference signal to produce multiplication results and adding the multiplication results within a data length; and a second set of multiply-accumulator units, each multiply-accumulator unit in the second set of multiply-accumulator units being capable of generating the pre-integration results of a data stream, wherein each pre-integration result is generated by multiplying each data point of the digitized signal by a respective data point of the second local reference signal to produce multiplication results and adding the multiplication results within the data length.

33. The receiver of claim 32, wherein the predetermined rate is a function of a pseudorandom noise code rate.

34. The receiver of claim 32, wherein the predetermined time period is a function of the duration of half the pseudorandom noise code chip.

35. The receiver of claim 32, wherein the signal processing unit further comprising a code clock generator coupled to the intermediate frequency signal preprocessing unit for controlling the pre-integration results of each data stream to be generated at the predetermined rate.

36. The receiver of claim 35, wherein the signal processing unit further comprising a code generator coupled to the code clock generator for generating a plurality of pseudorandom noise codes and sending each of the plurality of the pseudorandom noise codes to each block integrator.

37. The receiver of claim 32, wherein the signal processing unit further comprising a signal generator in communication with the intermediate frequency signal preprocessing unit for generating the first and the second local reference signals, wherein the first local reference signal is orthogonal of the second local reference signal, and the first and the second local reference signals are local carrier signals.

38. The receiver of claim 32, wherein the data length is a function of a pseudorandom code chip length.

39. The receiver of claim 32, wherein for each shift of a set of shift registers, each block integrator being capable of performing a second predetermined number of partial correlations, wherein each partial correlation is performed based on the predetermined number of pre-integration results in the set of shift registers and a shifted segment of the pseudorandom noise code, the segment of the pseudorandom noise code being shifted by a predetermined position.

40. The receiver of claim 39, wherein the predetermined position is a phase shift based on a pseudorandom code chip.

41. The receiver of claim 39, wherein after a plurality of shifting of the set of shift registers, each block integrator is capable of performing the first predetermined number of partial correlations.

42. The receiver of claim 32, wherein each of the block integrators further comprising a parallel multiply-accumulator unit for performing the partial correlation, wherein the partial correlation is obtained by performing multiplication and addition calculations based on the predetermined number of the pre-integration results of the data stream and a corresponding segment of the pseudorandom noise code.

43. The receiver of claim 32, wherein the signal processing unit further comprising an asynchronous interface coupled between the intermediate frequency signal preprocessing unit and the plurality of sets of shift registers, the asynchronous interface being capable of separating the sampling frequency and a working frequency, wherein each partial correlation is performed at the working frequency.

44. The receiver of claim 32, wherein the pseudorandom noise code is a Coarse/Acquisition code.

* * * * *